United States Patent
Liu

(10) Patent No.: US 7,261,456 B2
(45) Date of Patent: Aug. 28, 2007

(54) ILLUMINATED TRAFFIC WAND

(76) Inventor: Kuo-Hsin Liu, No. 8, Alley 32, Dahe St., Taichung (TW)

( * ) Notice: Subject to any disclaimer, the term of this patent is extended or adjusted under 35 U.S.C. 154(b) by 112 days.

(21) Appl. No.: 11/289,451

(22) Filed: Nov. 30, 2005

(65) Prior Publication Data

US 2007/0121332 A1   May 31, 2007

(51) Int. Cl.
 *F21V 33/00* (2006.01)
(52) U.S. Cl. .................. 362/577; 362/555; 362/800; 362/551
(58) Field of Classification Search .............. 362/551, 362/555, 577, 171, 178, 202, 203, 205, 800; 135/910
See application file for complete search history.

(56) References Cited

U.S. PATENT DOCUMENTS 6,036,576 A * 3/2000 Colon, Jr. ................... 446/473
6,293,684 B1 * 9/2001 Riblett ........................ 362/184
6,758,588 B2 * 7/2004 Hsu ............................. 362/497
2001/0024973 A1 * 9/2001 Meredith ...................... 463/36
2006/0250798 A1 * 11/2006 Herold ........................ 362/280

* cited by examiner

*Primary Examiner*—Jong-Suk (James) Lee
*Assistant Examiner*—Jacob Y Choi
(74) *Attorney, Agent, or Firm*—Birch, Stewart, Kolasch & Birch, LLP

(57) ABSTRACT

The illuminated traffic wand has a hilt, a wand, an illumination device, and a cap. The hilt is tubular and has a front end, a rear end, an illumination cavity at the rear end and a tapered wand seat at the front end. The wand is mounted securely in the tapered wand seat, is a rod of translucent material that transmits and radiates light and has a mounting pin and a tapered proximal end that corresponds to the tapered wand seat and has a pinhole that pinhole aligns with the mounting hole in the hilt. The mounting pin is mounted in the mounting hole and the pinhole to securely hold the wand in the hilt. The cap is connected to the rear end of the hilt, holds the illumination device in the illumination cavity and activates the illumination device to cause the wand to shine.

6 Claims, 5 Drawing Sheets

ILLUMINATED TRAFFIC WAND

BACKGROUND OF THE INVENTION

1. Field of the Invention

The present invention relates to a traffic wand, and more particularly to an illuminated traffic wand that can be assembled and fabricated quickly.

2. Description of Related Art

With reference to FIG. 5, conventional illuminated traffic wands (70) are used to visually communicate with drivers of vehicles and include multiple elements that are screwed together. Each element has threads corresponding to threads on adjacent elements. Even though, the conventional illuminated traffic wand (70) can be used as a weapon similar to a police baton, the conventional illuminated traffic wand (70) also has the following shortcomings.

1. However the spiraling segment of each shaft element of the illuminated traffic wand (70) may wear downs after a long time and loosens between each shaft element. Then the life of the illuminated traffic wand (70) will be shortening by the attrition of each shaft element.

2. In addition, the manufacture of each shaft element with a spiraling segment will increase the cost of production.

SUMMARY OF THE INVENTION

The main objective of the present invention is to provide an illuminated traffic wand that is easy to operate and produce.

The illuminated traffic wand has a hilt, a wand, an illumination device and a cap. The hilt is tubular and has a front end, a rear end, an illumination cavity at the rear end and a tapered wand seat at the front end. The wand is mounted securely in the tapered wand seat, is a rod of translucent material that transmits and radiates light and has a mounting pin and a tapered proximal end that corresponds to the tapered wand seat and has a pinhole that pinhole aligns with the mounting hole in the hilt. The mounting pin is mounted in the mounting hole and the pinhole to securely hold the wand in the hilt. The cap is connected to the rear end of the hilt, holds the illumination device in the illumination cavity and activates the illumination device to cause the wand to shine.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
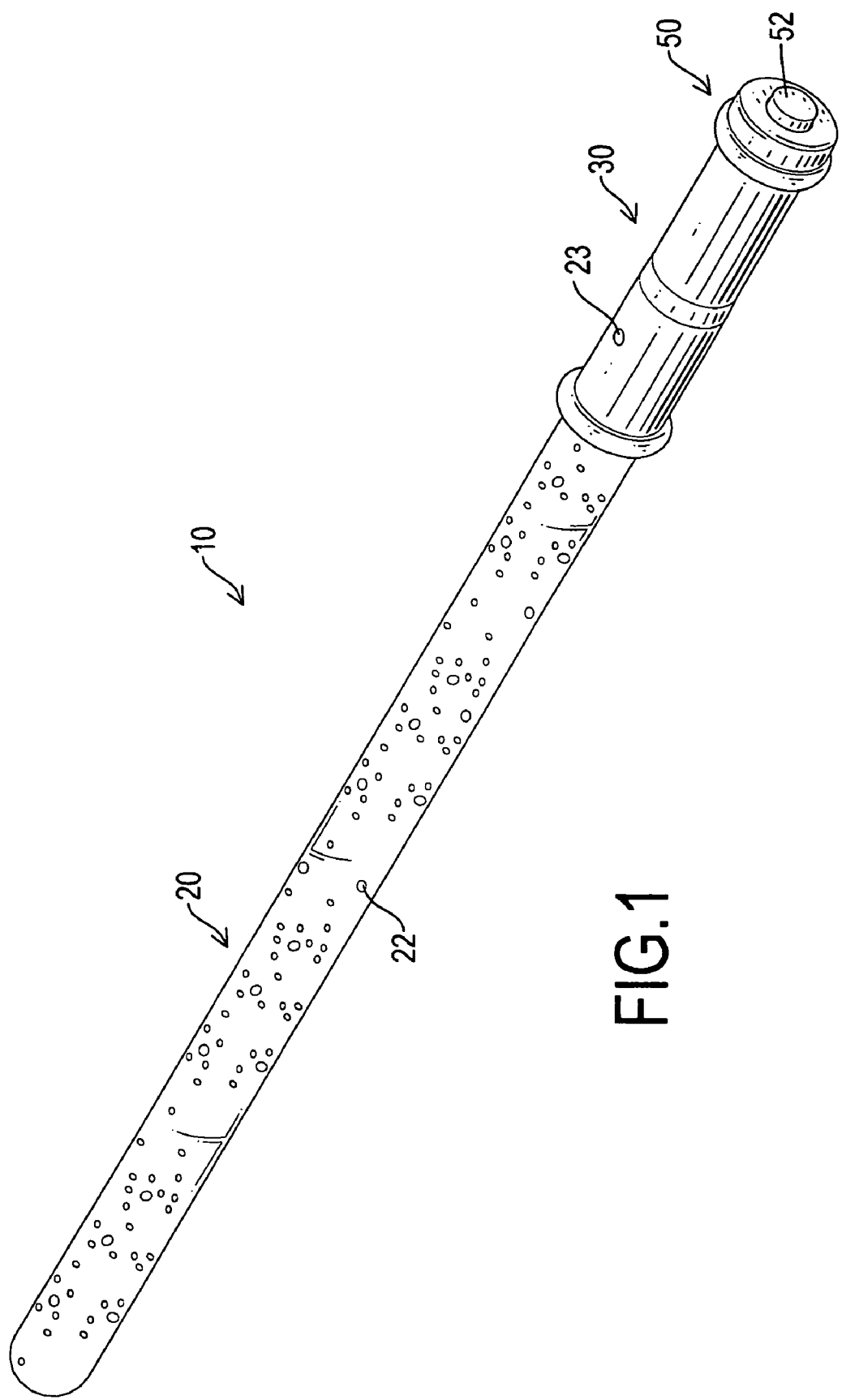
FIG. 1 is a perspective view of the illuminated traffic wand in accordance with the present invention.
Figure 2:
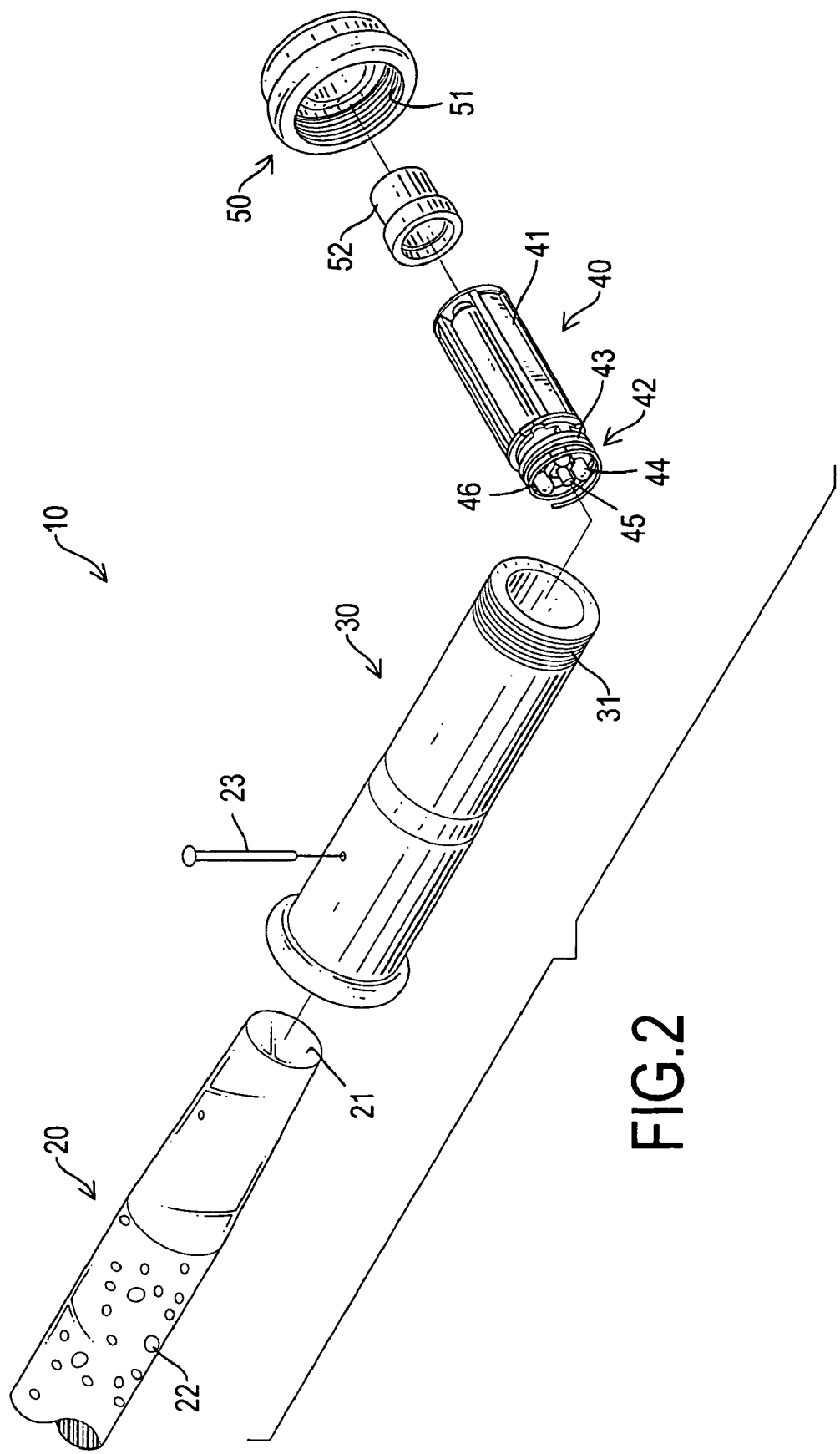
FIG. 2 is an exploded perspective view of the illuminated traffic wand in FIG. 1.

With reference to FIGS. 1 and 2, an illuminated traffic wand (10) in accordance with the present invention comprises a hilt (30), a wand (20), an illumination device (40) and a cap (50).

The hilt (30) is tubular and has an interior, a front end, a rear end, an external surface, a mounting hole and an optional external thread (31). The interior of the hilt (30) comprises an illumination cavity and a tapered wand seat. The illumination cavity is formed at the rear end of the hilt (30). The tapered wand seat is formed at the front end of the hilt (30) and communicates with the illumination cavity. The mounting hole is formed radially through the hilt (30) near the front end. The external thread (31) is formed on the external surface of the hilt (30) at the rear end.

The wand (20) is a rod of translucent material that transmits and radiates light and comprises a distal end, a proximal end, a mounting pin (23) and multiple optional bubbles (22). The distal end may be rounded. The proximal end is tapered, corresponds to the tapered wand seat in the interior of the hilt (30) and has a pinhole and a flat surface (21). The pinhole aligns with the mounting hole in the hilt (30) to connect the wand (20) to the hilt (30). The mounting pin (23) is mounted in the mounting hole in the hilt (30) and the pinhole in the proximal end to securely hold the wand (20) in the hilt (30). The bubbles (22) are formed inside the translucent material of the wand (20) to diffuse and scatter light transmitted through the wand (20).

The illumination device (40) is mounted in the illumination cavity in the hilt (30), illuminates and makes the wand (20) shine and comprises a battery seat (41), an illumination element (42) and a spring (46). The battery seat (41) has a front end and a rear end. The front end of the battery seat (41) faces the flat surface (21) at the proximal end of the wand (20). The illumination element (42) is mounted on the front end of the battery seat (41) and has a circuit board (43), multiple light sources (44) and a switch (45). The circuit board (43) has a front surface, a rear surface and a center. The front surface faces the flat surface (21) at the proximal end of the wand (20). The light sources (44) are mounted on the front surface of the circuit board (43) and may be discrete light bulbs or light emitting diodes (LED). The switch (45) is mounted on the front surface at the center of the circuit board (43) and may be a pushbutton toggle switch. The spring (46) is attached to the front surface of the circuit board (43) and abuts the flat surface (21) at the proximal end of the wand (20).

Figure 4:
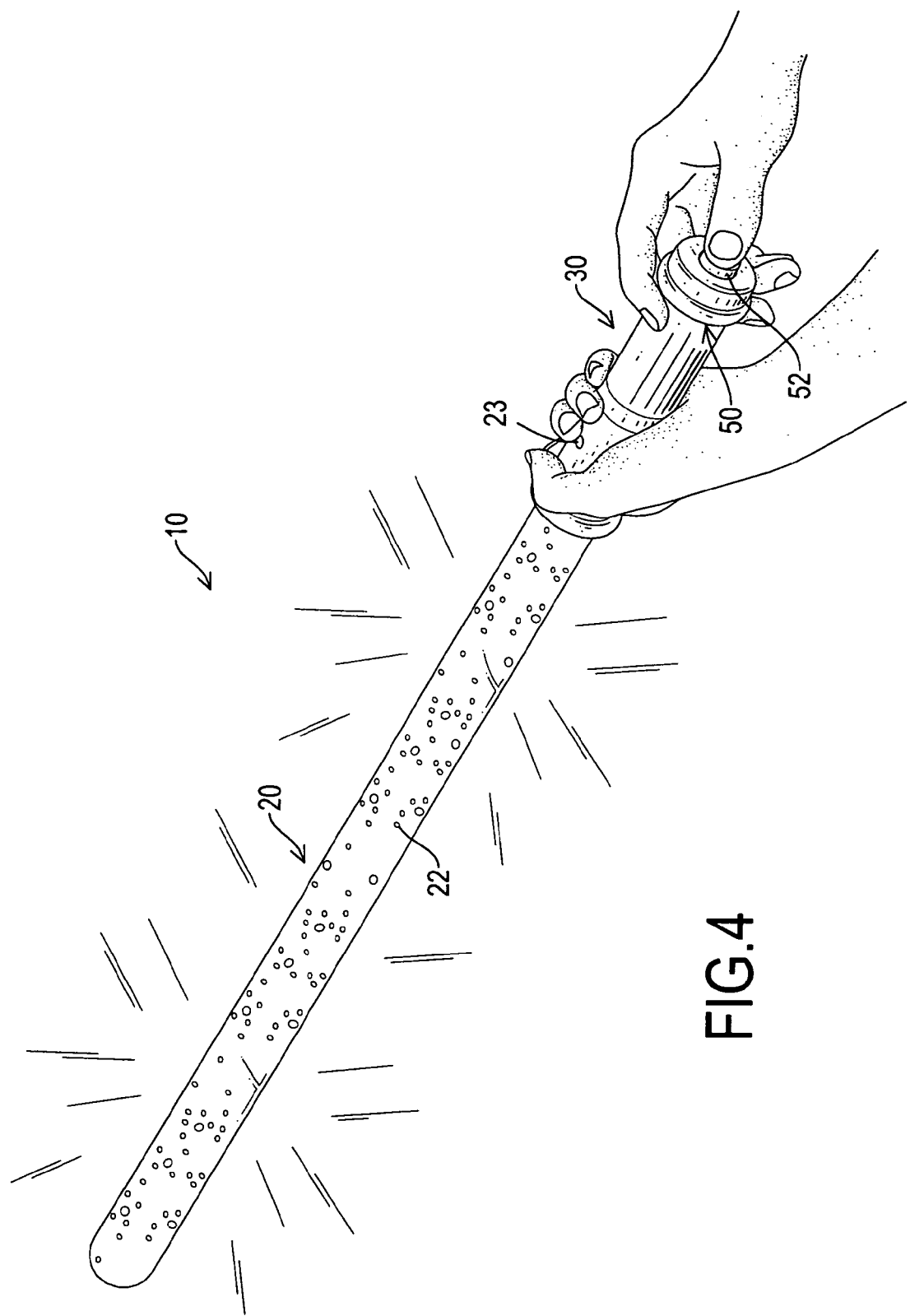
FIG. 4 is an operational perspective view of the illuminated traffic wand in FIG. 1.
Figure 5:
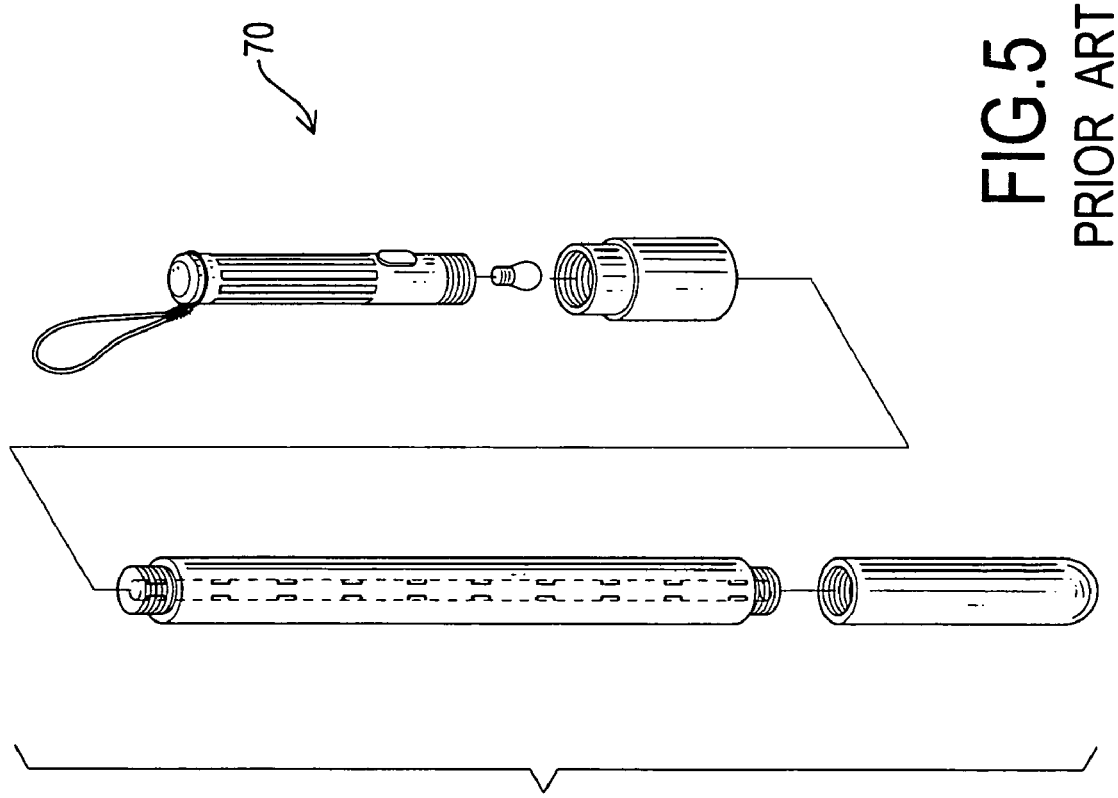
FIG. 5 is an exploded perspective view of a conventional illuminated traffic wand in accordance with the prior art.

With further reference to FIG. 4, the cap (50) is connected to the rear end of the hilt (30), holds the illumination device (40) in the illumination cavity in the interior of the hilt (30), activates the illumination device (40) to cause the wand (20) to shine and comprises a sleeve and a pushbutton (52). The sleeve is connected to the rear end of the hilt (30) and has an inner end an outer end, an optional internal thread (51) and a lip. The internal thread (51) is formed inside the sleeve at the inner end and corresponds and attaches to the external thread (31) on the hilt (30). The lip is formed at the outer end of the sleeve and protrudes inward. The pushbutton (52) is mounted slidably inside the sleeve, protrudes from the outer end of the sleeve and has an outer end, an inner end and a flange.

Figure 3:
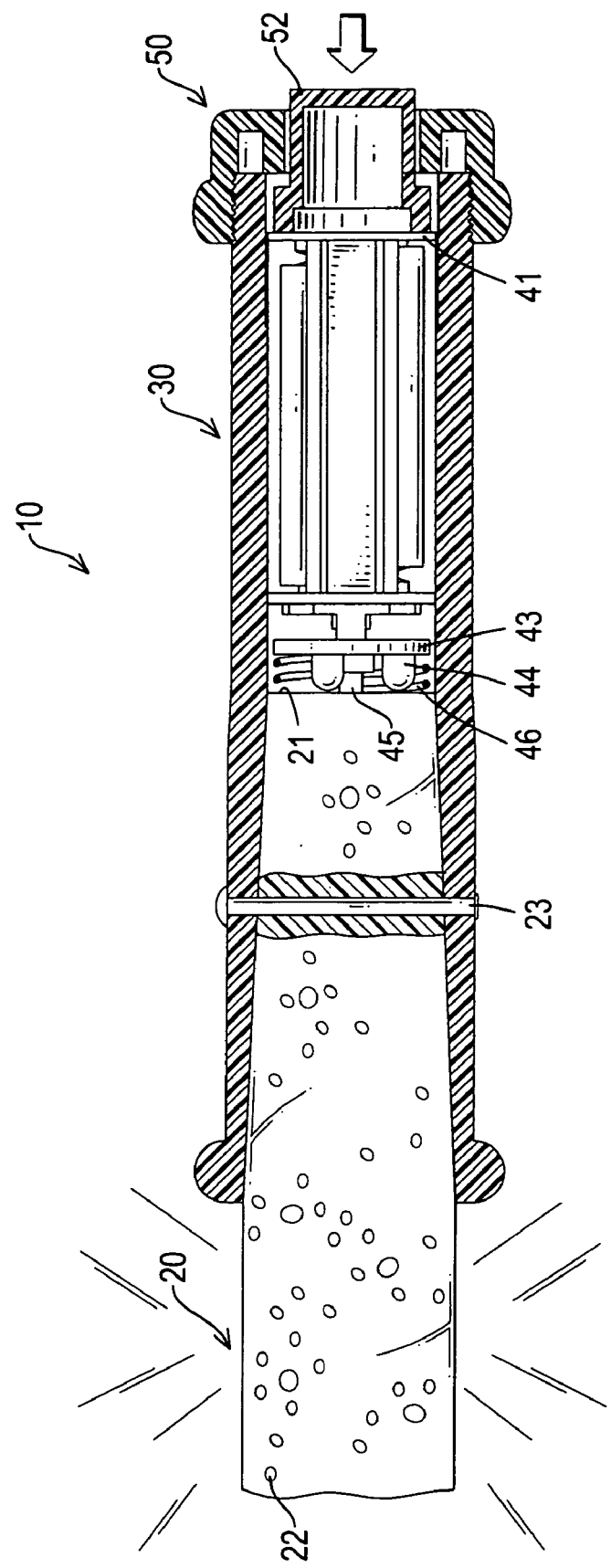
FIG. 3 is an enlarged operational side view in partial section of the illuminated traffic wand in FIG. 1.

With further reference to FIG. 3, the outer end of the pushbutton protrudes from the outer end of the sleeve and is pressed to activate the switch (45) and the light sources (44) on the circuit board (43) by pressing the switch (45) against the flat surface (21) at the proximal end of the wand (20) to cause the wand (20) to shine. The flange is formed around and protrudes radially out from the inner end of the pushbutton and is held in the cap (50) by the lip.

The illuminated traffic wand (10) as described has the following advantages.

1. The wand (20) of the illuminated traffic wand (10) is a single piece and does not have any parts that wear. Therefore the wand (20) will not fail based on normal use. Consequently, the life of the illuminated traffic wand (10) will be longer than a conventional illuminated traffic wand (70) with wand elements that screw to each other.

2. The simplified design of the illuminated traffic wand (10) causes the manufacturing and assembly to be cheaper and quicker.

Even though numerous characteristics and advantages of the present utility model have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An illuminated traffic wand comprising
    a hilt being tubular and having
        an interior comprising
            an illumination cavity formed at the rear end of the hilt; and
            a tapered wand seat formed at the front end of the hilt and communicating with the illumination cavity;
        a front end;
        a rear end;
        an external surface;
        a mounting hole formed radially through the hilt near the front end;
    a wand being a rod of translucent material that transmits and radiates light and comprising
        a distal end;
        a proximal end being tapered, corresponding to the tapered wand seat of the interior of the hilt and having
            a pinhole aligning with the mounting hole in the hilt to connect the wand to the hilt; and
            a flat surface; and
        a mounting pin mounted in the mounting hole in the hilt and the pinhole in the proximal end to securely hold the wand in the hilt;
    an illumination device mounted in the illumination cavity in the hilt for illuminating and making the wand shine and comprising
        a battery seat having
            a front end facing the flat surface at the proximal end of the wand; and
            a rear end;
        an illumination element mounted on the front end of the battery seat and having
            a circuit board having
                a front surface facing the flat surface at the proximal end of the wand; and
                a rear surface;
            multiple light sources mounted on the front surface of the circuit board; and
            a switch mounted on the front surface of the circuit board; and
        a spring attached to the front surface of the circuit board and abutting the flat surface at the proximal end of the wand;
    a cap connected to the rear end of the hilt, holding the illumination device in the illumination cavity in the interior of the hilt for activating the illumination device to cause the wand to shine and comprising
        a sleeve connected to the rear end of the hilt and having
            an inner end;
            an outer end; and
            a lip formed at the outer end of the sleeve and protruding inward; and
        a pushbutton mounted slidably inside the sleeve, protruding from the outer end of the sleeve and having
            an outer end protruding from the outer end of the sleeve for being pressed to activate the switch and the light sources on the circuit board by pressing the switch against the flat surface at the proximal end of the wand;
            an inner end; and
            a flange formed around and protruding radially out from the inner end of the pushbutton and held in the cap by the lip.

2. The illuminated traffic wand as claimed in claim 1, wherein
    the hilt further has an external thread formed on the external surface of the hilt at the rear end; and
    the sleeve of the cap further has an internal thread formed inside the sleeve at the inner end and corresponding and attaching to the external thread on the hilt.

3. The illuminated traffic wand as claimed in claim 1, wherein the distal end of the wand is rounded.

4. The illuminated traffic wand as claimed in claim 1, wherein the wand further comprises multiple bubbles formed in the translucent material of the wand.

5. The illuminated traffic wand as claimed in claim 1, wherein the light sources of the illumination device are light emitting diodes (LEDs).

6. The illuminated traffic wand as claimed in claim 1, wherein the switch is a pushbutton toggle switch.

* * * * *